(12) United States Patent
Du et al.

(10) Patent No.: US 9,671,642 B2
(45) Date of Patent: Jun. 6, 2017

(54) DISPLAY PANEL AND DISPLAY DEVICE

(71) Applicant: BOE TECHNOLOGY GROUP CO., LTD., Beijing (CN)

(72) Inventors: Zhihong Du, Beijing (CN); Shang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/359,320

(22) PCT Filed: Jun. 20, 2013

(86) PCT No.: PCT/CN2013/077526
§ 371 (c)(1),
(2) Date: May 20, 2014

(87) PCT Pub. No.: WO2014/169519
PCT Pub. Date: Oct. 23, 2014

(65) Prior Publication Data
US 2015/0177564 A1    Jun. 25, 2015

(30) Foreign Application Priority Data

Apr. 17, 2013 (CN) .......................... 2013 1 0134148

(51) Int. Cl.
*G02F 1/1335* (2006.01)
(52) U.S. Cl.
CPC .. *G02F 1/133553* (2013.01); *G02F 1/133514* (2013.01); *G02F 2001/133565* (2013.01)
(58) Field of Classification Search
CPC ......... G02F 1/133553; G02F 1/133514; G02F 2001/133565

USPC ......................................................... 349/106
See application file for complete search history.

(56) References Cited

U.S. PATENT DOCUMENTS

| 7,079,207 | B2 | 7/2006 | Kashima | |
|---|---|---|---|---|
| 2002/0071071 | A1* | 6/2002 | Sekiguchi | G02B 5/201 349/106 |
| 2003/0160924 | A1 | 8/2003 | Kashima | |
| 2004/0008301 | A1* | 1/2004 | Yoon | G02F 1/13362 349/115 |
| 2004/0135502 | A1* | 7/2004 | Kobayashi | H01L 27/322 313/506 |
| 2005/0062906 | A1* | 3/2005 | Ishizaki | G02F 1/13362 349/96 |

(Continued)

FOREIGN PATENT DOCUMENTS

| CN | 202472014 U | 10/2012 |
|---|---|---|
| JP | 2010-19958 A | 1/2010 |

OTHER PUBLICATIONS

English Translation of the International Search Report of PCT/CN2013/077526 published in English on Oct. 23, 2014.

(Continued)

*Primary Examiner* — Charles Chang
(74) *Attorney, Agent, or Firm* — Collard & Roe, P.C.

(57) ABSTRACT

A display panel and a display device are provided, the display panel includes a color filter layer (230); a reflective filter (281) is provided below the color filter layer (230), and the reflective filter (281) is configured to reflect light with wavelength smaller than a predetermined value and configured to transmit light with wavelength greater than or equal to the predetermined value.

10 Claims, 5 Drawing Sheets

(56) References Cited

U.S. PATENT DOCUMENTS

2006/0007373 A1\* 1/2006 Arai ................. G02B 5/201
 349/113
2008/0174716 A1\* 7/2008 Chen ................ G02F 1/133514
 349/61

OTHER PUBLICATIONS

English translation of the International Preliminary Report on Patentability and Written Opinion of the International Searching Authority of PCT/CN2013/077526, issued Oct. 20, 2015.
Chinese Office Action of Chinese Application No. 201310134148.X, mailed Jan. 21, 2015 with English translation.
International Search Report, International Preliminary Report on Patentability and Written Opinion of the International Searching Authority of PCT/CN2013/077526 in Chinese, mailed Jan. 23, 2014.

\* cited by examiner

DISPLAY PANEL AND DISPLAY DEVICE

CROSS REFERENCE TO RELATED APPLICATIONS

This application is the National Stage of PCT/CN2013/077526 filed on Jun. 20, 2014, which claims priority under 35 U.S.C. §119 of Chinese Application No. 201310134148.X filed on Apr. 17, 2013, the disclosure of which is incorporated by reference. The international application under PCT article 21(2) was not published in English.

TECHNICAL FIELD

Embodiments of the present invention relate to a display panel and a display device.

BACKGROUND

Figure 1:
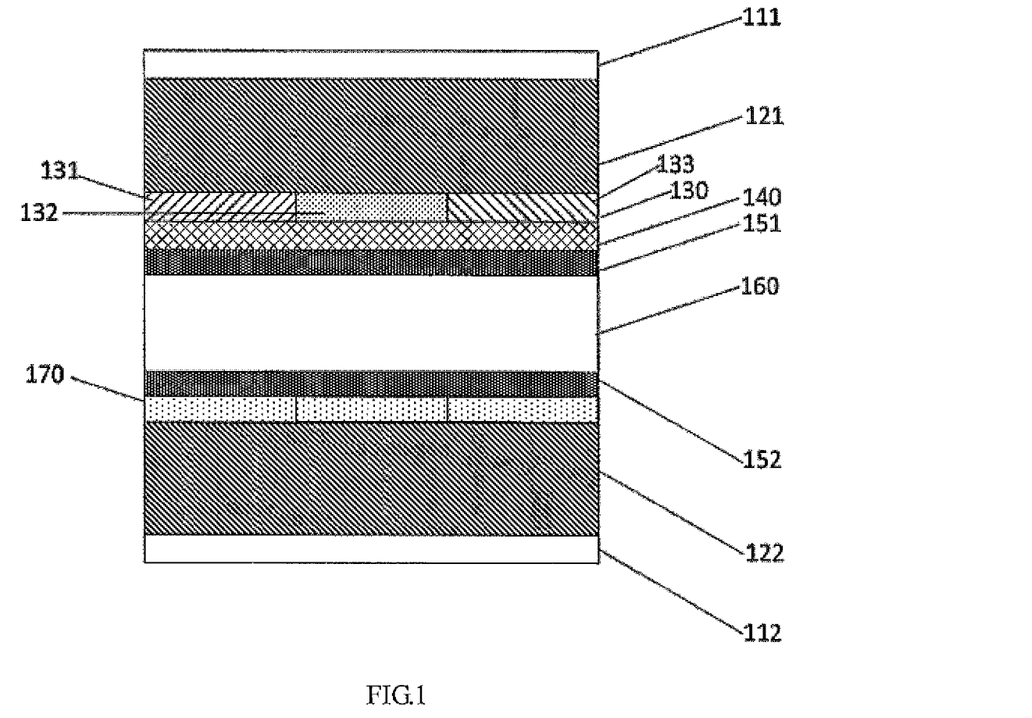
FIG. 1 is a view schematically illustrating a structure of a conventional liquid crystal display panel.

The structure of a conventional liquid crystal display panel is illustrated in FIG. 1, and comprises an upper polarizer 111, an upper substrate 121, a color filter layer 130, a common electrode layer 140, an upper alignment layer 151, a liquid crystal layer 160, a lower alignment layer 152, a pixel electrode layer 170, a lower substrate 122 and a lower polarizer 112 that are provided sequentially from top to bottom. The color filter layer comprises a blue filter 131, a green filter 132 and a red filter 133; the pixel electrode layer 170 comprises a plurality of pixel electrodes.

The disadvantages of the above conventional solution lie in that majority of the light ray emitting from a backlight is absorbed after passing through the green filter 132 and the red filter 133, and only a small part of the light ray can transmit therethrough, thereby leading to a lower utilization rate of light emitting from the backlight.

SUMMARY

An embodiment of the present invention provides a display panel comprising a color filter layer, a reflective filter is provided below the color filter layer; the reflective filter is configured to reflect light with wavelength smaller than a predetermined value and configured to transmit light with wavelength greater than or equal to the predetermined value.

The reflective filter is provided above a common electrode layer.

The reflective filter is provided below a red filter and a green filter of the color filter layer; and the predetermined value is greater than 470 nm and smaller than or equal to 500 nm.

A light-transparent sheet is further provided below a blue filter of the color filter layer; and the light-transparent sheet is provided in a same layer as the reflective filter, and comprises a transparent material.

The reflective filter is provided below the red filter of the color filter layer; and the predetermined value is greater than 530 nm and smaller than or equal to 620 nm.

The light-transparent sheet is further provided below the blue filter and the green filter of the color filter layer; and the light-transparent sheet is provided in a same layer with the reflective filter, and comprises a transparent material.

The reflective filter comprises a first reflective filter and a second reflective filter; the first reflective filter is provided below the red filter of the color filter layer, configured to reflect light with wavelength smaller than a first predetermined value, and configured to transmit light with wavelength greater than or equal to the first predetermined value; the first predetermined value is greater than 530 nm and smaller than or equal to 620 nm; the second reflective filter is provided below the green filter of the color filter layer, configured to reflect light with wavelength smaller than a second predetermined value, and configured to transmit light with wavelength greater than or equal to the second predetermined value; the second predetermined value is greater than 470 nm and smaller than or equal to 500 nm.

A main film system of the reflective filter is as follows:

$$\left(\frac{H}{2} L \frac{H}{2}\right)^M;$$

where H stands for a first film layer, H/2 stands for a second film layer having a same refraction index as the first film layer, a thickness of the second film layer is half of a thickness of the first film layer, L stands for a third film layer, and M stands for a mount of period.

Refraction index of the first film layer is higher than that of the third film layer.

A formula of calculating a thickness h of the first film layer and a thickness l of the third film layer is as follows:

$$\begin{cases} \Delta\lambda = 2\Delta g \lambda_0 = \frac{4\lambda_0}{\pi} \sin^{-1}\left(\frac{n_H - n_L}{n_H + n_L}\right); \\ \frac{\Delta\lambda}{2} + \lambda_0 = \lambda; \\ l = h = \frac{\lambda_0}{4}; \end{cases}$$

where $\Delta\lambda$ stands for a width of a stop band, $\lambda_0$ stands for a central wavelength of the stop band, $n_H$ stands for a refraction index of the first film layer, $n_L$ stands for a refraction index of the third film layer, and $\lambda$ stands for the predetermined value.

A formula of calculating the amount of period M is as follows:

$$T_R = \frac{16 n_0 n_g}{\left(\frac{n_H}{n_L}\right)^{2M} \left\{(n_0 + n_g)^2 + \left(\frac{n_0 n_g}{n_H} - n_H\right)^2\right\}};$$

where $T_R$ stands for transmittance of the reflective filter at a central wavelength of the stop band, $n_0$ stands for a refraction index of an upper base of the reflective filter, $n_g$ stands for a refraction index of a lower base of the reflective filter, $n_H$ stands for a refraction index of the first film layer, and $n_L$ stands for a refraction index of the third film layer.

An embodiment of the present invention further provides a display device, comprising the above display panel.

DETAILED DESCRIPTION

With reference to accompanying drawings and embodiments, specific implementations of the present invention will be described in detail in the following. The following embodiments are used to describe the present invention and not limitative to the scope of the present invention.

The design principle of the present invention is that, before light reaches a color filter, part of the light in wave bands that would have been absorbed is reflected to a backlight to be reused, thus realizing an increase in a light utilization rate. With reference to the accompanying drawings and the embodiments, technical solutions of the present invention will be described in detail in the following.

First Embodiment

Figure 2:
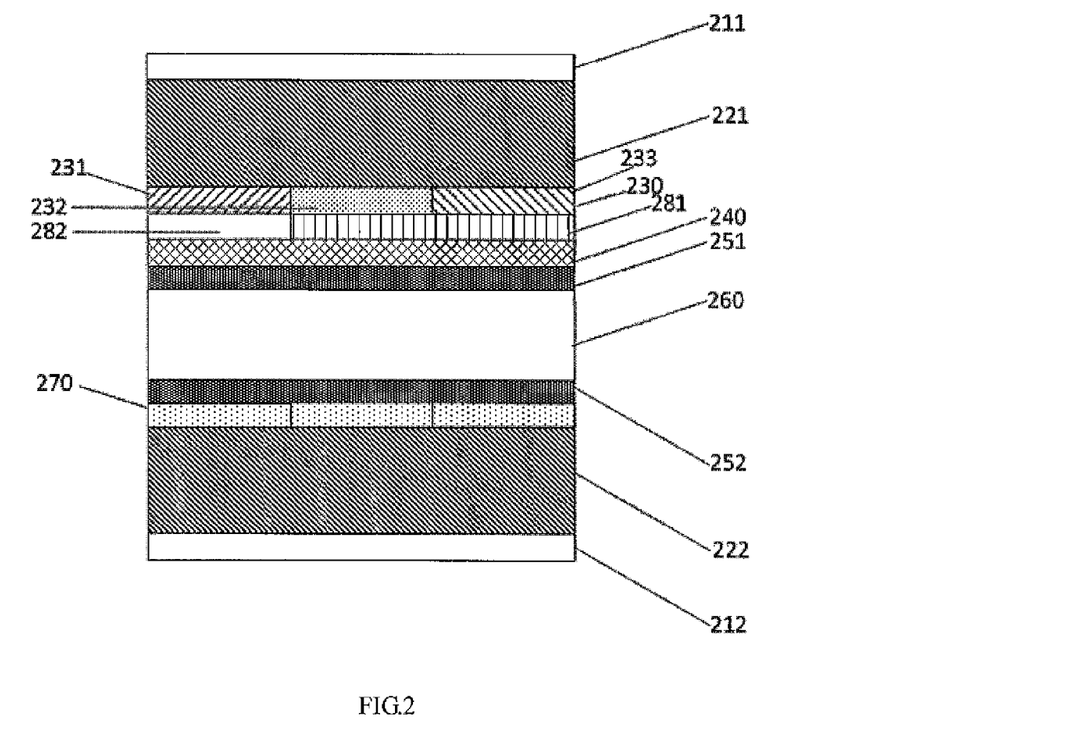
FIG. 2 is a view schematically illustrating a structure of a liquid crystal display panel of a first embodiment of the present invention.

FIG. 2 is a view schematically illustrating a structure of a liquid crystal display panel of a first embodiment of the present invention. As illustrated in FIG. 2, in the liquid crystal display panel, a reflective filter 281 is provided between a color filter layer 230 and a common electrode layer 240. The reflective filter 281 is configured to reflect light with wavelength smaller than a predetermined value, and configured to transmit light with wavelength greater than or equal to the predetermined value.

For example, the predetermined value can be determined as 500 nm. According to the wavelength information of visible light (the wavelength of blue light comprises 430-470 nm, the wavelength of green light comprises 500-530 nm, the wavelength of red light comprises 620-770 nm, and the wavelength of yellow light comprises 560-590 nm), it can be known that when the predetermined value is determined as 500 nm, the reflective filter 281 can realize reflection for blue light. Besides, according to the wavelength information of visible light, in order to increase utilization rate of blue light, the predetermined value can be also determined as another value in the range from 470 nm to 500 nm, for example 480 nm, and so on.

Referring to FIG. 2, in this embodiment, the reflective filter 281 is provided below a red filter 232 and a green filter 233 of the color filter layer. In the conventional configuration, when blue light passes through a red filter and a green filter, majority of the blue light is absorbed, thus leading to light waste. However, by provision of the reflective filter 281, blue light can be effectively reflected, the reflected blue light returns to a backlight and is reused, and finally transmits through a blue filter 231 that is not sheltered by the reflective filter 281.

The reflective filter 281 can also be provided below the red filter 232 only, or below the green filter 233 only, or below a partial region of the red filter 232 and the green filter 233. In these configurations, the utilization rate of blue light can also be increased to a certain extent.

Referring to FIG. 2, in this embodiment, a light-transparent sheet 282 is provided below the blue filter 231 of the color filter layer 230. The light-transparent sheet 282 is provided in a same layer as the reflective filter 281 and comprises a transparent material, for example, glass or the like. In addition, if a formation process permits, no filling materials is provided below the blue filter 231 so as to save costs.

Further, in this embodiment, an upper substrate 221 and an upper polarizer 211 are farther sequentially provided on the color filter layer 230. A common electrode layer 240 is provided below the reflective filter 281 and the light-transparent sheet 282. Below the common electrode layer 240, an upper alignment layer 251, a liquid crystal layer 260, a lower alignment layer 252, a pixel electrode layer 270 comprising a plurality of pixel electrodes, a lower substrate 222 and a lower polarizer 212 are further sequentially provided.

Figure 3:
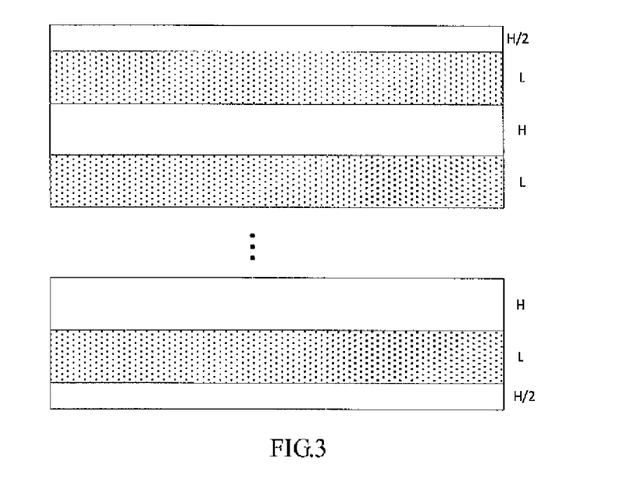
FIG. 3 is a view schematically illustrating a film layer structure of a color filter described by the first embodiment of the present invention.

FIG. 3 is a view schematically illustrating a film layer structure of the color filter provided by the first embodiment of the present invention. As illustrated in FIG. 3, a main film system of the reflective filter 281 is represented as follows:

$$\left(\frac{H}{2} L \frac{H}{2}\right)^M;$$

where H stands for a first film layer; H/2 stands for a second film layer having a same refraction index as the first film layer, a thickness of the second film layer is half of the thickness of the first film layer; L stands for a third film layer; and M stands for the amount of period. A refraction index of the first film layer H is higher than that of the third film layer L.

The amount of period M is assumed to be 3, then from top to bottom, the reflective filter 281 are sequentially H/2, L, H, L, H, L, H/2, that is, sequentially the second film layer, the third film layer, the first film layer, the third film layer, the first film layer, the third film layer, the second film layer.

In this embodiment, the thicknesses of the first film layer and the third film layer are equal to each other and both are ¼ of the central wavelength of a stop band. Specifically, the formula for calculating the thicknesses of the first film layer and the third film layer is as follows:

$$\begin{cases} \Delta\lambda = 2\Delta g \lambda_0 = \frac{4\lambda_0}{\pi}\sin^{-1}\left(\frac{n_H - n_L}{n_H + n_L}\right); \\ \frac{\Delta\lambda}{2} + \lambda_0 = \lambda; \\ l = h = \frac{\lambda_0}{4}; \end{cases}$$

where $\Delta\lambda$ stands for a width of the stop band, $\lambda_0$ stands for a central wavelength of the stop band, $n_H$ stands for a refraction index of the first film layer, $n_L$ stands for a refraction index of the third film layer, $\lambda$ stands for a predetermined value, h stands for a thickness of the first film layer, and l stands for a thickness of the third film layer.

Given that the predetermined value is 500 nm, the first film layer uses titanium dioxide (refraction index thereof is 2.1), and the third film layer uses silicon dioxide (refraction index is 1.46), based on the above formulas, it can be obtained through calculation that $\lambda_0$=448.4 nm, $\Delta\lambda$=103.2 nm, and h=l=112.1 nm.

A formula for calculating the amount of period M is as follows:

$$T_R = \frac{16 n_0 n_g}{\left(\frac{n_H}{n_L}\right)^{2M} \left\{(n_0 + n_g)^2 + \left(\frac{n_0 n_g}{n_H} - n_H\right)^2\right\}};$$

where $T_R$ stands for the transmittance of the reflective filter at the central wavelength of the stop band, $n_0$ stands for the refraction index of an upper base of the reflective filter, $n_g$ stands for the refraction index of a lower base of the reflective filter. In this embodiment, the refraction index of the upper base is the refraction index of the color filter layer 230, and the refraction index of the lower base is the refraction index of the common electrode layer 240.

Figure 4:
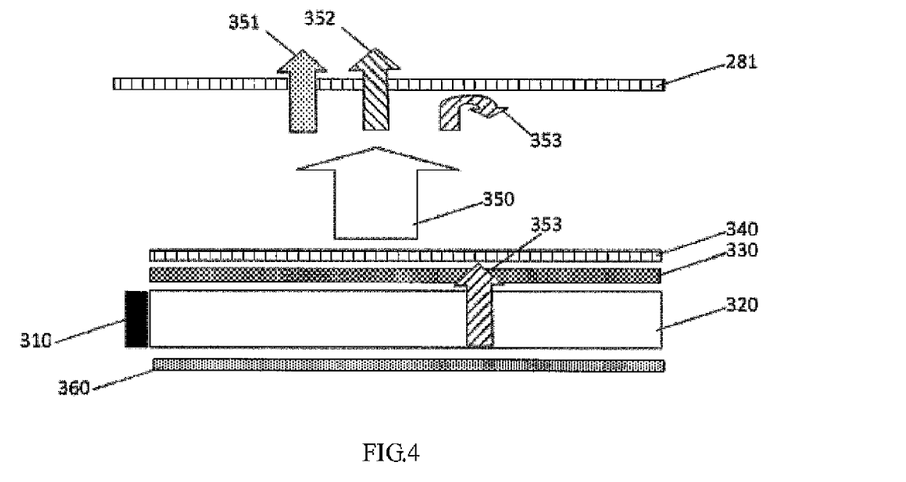
FIG. 4 is a diagram schematically illustrating a principle of increasing light utilization rate of the liquid crystal display panel described by the first embodiment of the present invention.

FIG. 4 is a diagram schematically illustrating a principle of increasing light utilization rate of the liquid crystal display panel provided by the first embodiment of the present invention. As indicated in FIG. 4, light rays emitting from a light source 310, after passing through a light guiding plate 320, a diffusion film 330 and a prism film 340, in the form of white light 350, are incident to the reflective filter 281 of a liquid crystal screen; in the white light 350, a red component 351 and a green component 352 are transmitted through the reflective filter 281, and a blue component 353 is reflected to a reflector plate 360, then reflected to the liquid crystal screen, and finally transmitted through the blue filter 231 where the reflective filter 281 is not provided. In this way, the blue light emitting from the light source avoids being absorbed by the red filter 232 and the green filter 233, and then utilization rate is increased.

With the liquid crystal panel of the embodiment of the present invention, if tone of LED lamp is not changed, then images displayed on the liquid crystal screen will be blue shifted. In order to modify white points for the pictures of the liquid crystal screen, the blue light component in the LED lamp is reduced so as to decrease power, or red and green light components are increased so as to increase brightness.

Second Embodiment

Figure 5:
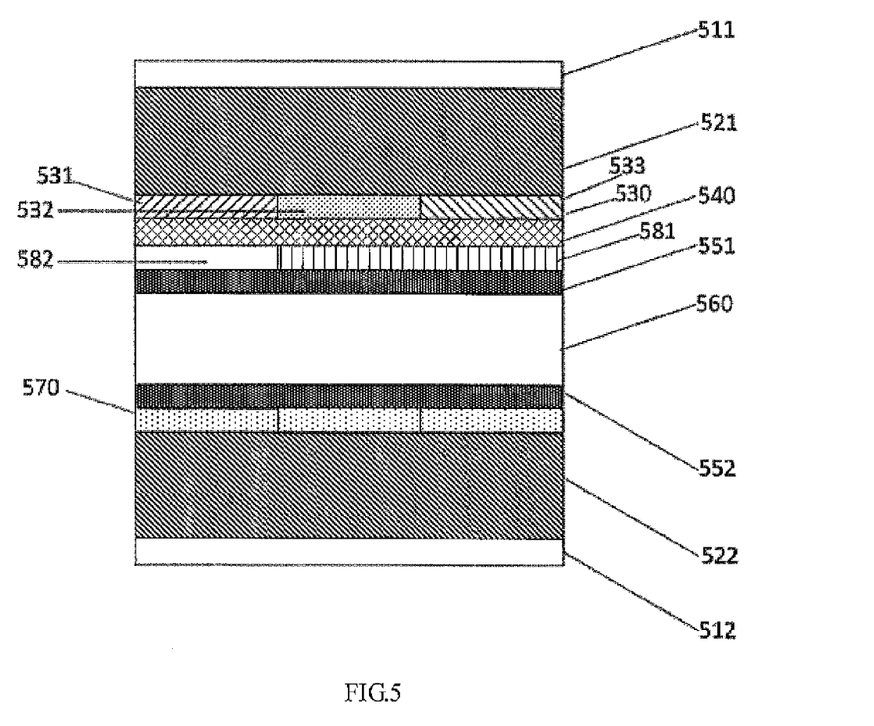
FIG. 5 is a view schematically illustrating a structure of a liquid crystal display panel described by a second embodiment of the present invention.

FIG. 5 is a view schematically illustrating a structure of a liquid crystal display panel described by the second embodiment of the present invention. As illustrated in FIG. 5, the liquid crystal display panel described by this embodiment and that described by first embodiment are basically the same, and the difference lies in that, in this embodiment, a reflective filter 581 is provided between a common electrode layer 540 and an upper alignment layer 551, and the reflective filter 581 is provided below a red filter 532 and a green filter 533. In the meantime, a light-transparent sheet 582 is provided in a same layer as the reflective filter 581, and the light-transparent sheet 582 is provided in the area of the projection of a blue filter 531.

In addition, a color filter layer 530, an upper substrate 521 and an upper polarizer 511 are sequentially provided on the common electrode layer 540; below the upper alignment layer 551, a liquid crystal layer 560, a lower alignment layer 552, a pixel electrode layer 570 comprising a plurality of pixel electrodes, a lower substrate 522, and a lower polarizer 512 are sequentially provided, and detailed description thereto is omitted here.

Third Embodiment

Figure 6:
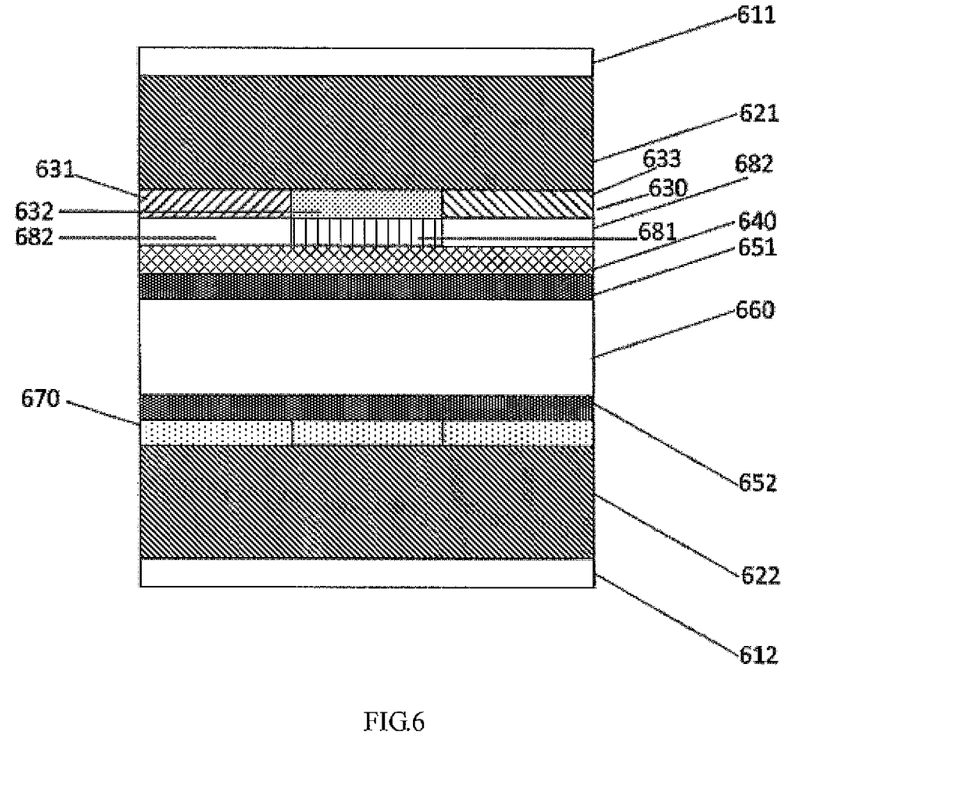
FIG. 6 is a view schematically illustrating a structure of a liquid crystal display panel described by a third embodiment of the present invention.

FIG. 6 is a view schematically illustrating a structure of a liquid crystal display panel described by the third embodiment of the present invention. As illustrated in FIG. 6, the liquid crystal display panel described by this embodiment and that described by the first embodiment are basically the same, and the difference lies in that, in this embodiment, a reflective filter 681 is provided below a red filter 632 only. In this embodiment, the predetermined value is greater than 530 nm and smaller than or equal to 620 nm. According to the wavelength information of visible light, it can be known that the reflective filter 681 can reflect blue light and green light simultaneously, thus can prevent the blue light and the green light from being absorbed by the red filter 632 simultaneously, and is helpful for increasing light utilization rate.

In the meantime, a light-transparent sheet 682 is provided in a same layer as the reflective filter 681, and the light-transparent sheet 682 is provided below a blue filter 631 and a green filter 633.

In addition, an upper substrate 621 and an upper polarizer 611 are sequentially provided on a color filter layer 630; below a common electrode 640, an upper alignment layer 651, a liquid crystal layer 660, a lower alignment layer 652, a pixel electrode layer 670 made of a plurality of pixel electrodes, a lower substrate 622 and a lower polarizer 612 are sequentially provided. Detailed description thereto is omitted here.

Fourth Embodiment

Figure 7:
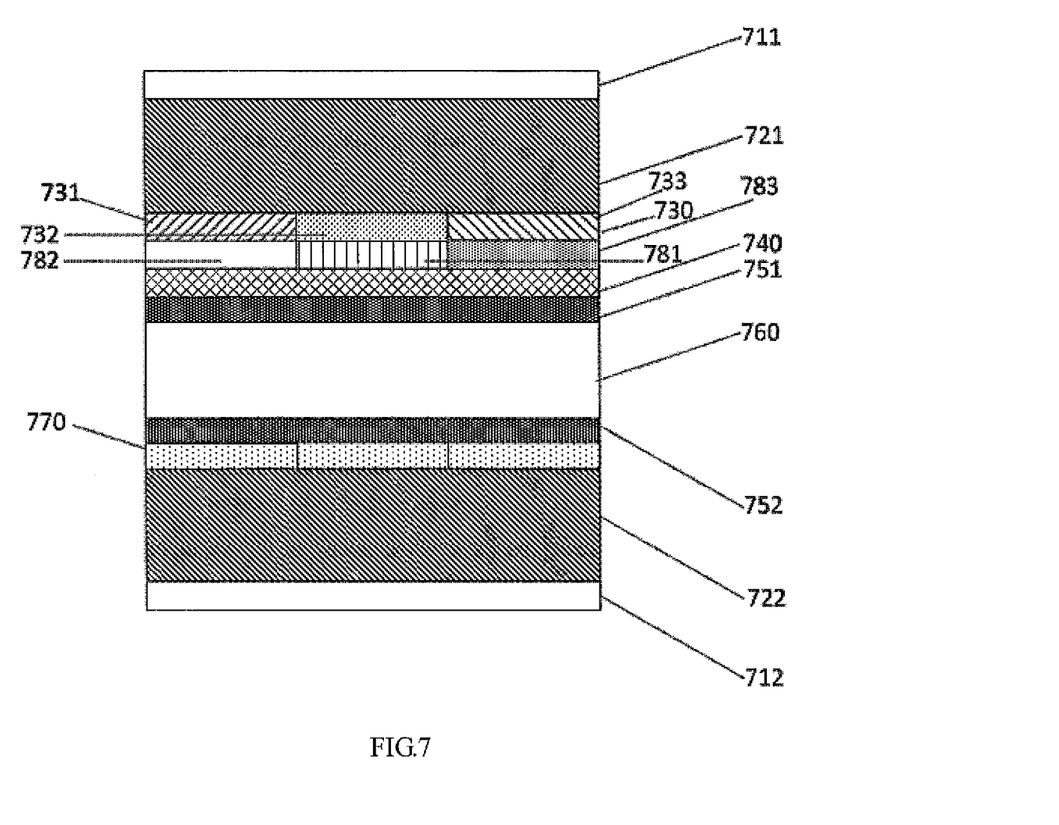
FIG. 7 is a view schematically illustrating a structure of a liquid crystal display panel described by a fourth embodiment of the present invention.

FIG. 7 is a view schematically illustrating a structure of a liquid crystal display panel described by the fourth embodiment of the present invention. As illustrated in FIG. 7, the liquid crystal display panel described by this embodiment and that described by the first embodiment are basically the same, and the difference lies in that, in this embodiment, the reflective filter comprises a first reflective filter 781 and a second reflective filter 783. The first reflective filter 781 is provided below a red filter 732 of a color filter layer 730, configured to reflect light with wavelength smaller than a first predetermined value, and configured to transmit light with wavelength greater than or equal to the first predetermined value; the first predetermined value is greater than 530 nm and smaller than or equal to 620 nm. The second reflective filter 783 is provided below a green filter 733 of the color filter layer 730, configured to reflect light with wavelength smaller than a second predetermined value, and configured to transmit light with wavelength greater than or equal to the second predetermined value; the second predetermined value is greater than 470 nm and smaller than or equal to 500 nm.

According to the wavelength information of visible light, it can be known that, in the reflective filter, the first reflective filter 781 can reflect blue light and green light simultaneously, and the second reflective filter 783 can reflect blue light. Compared with the previous third embodiment, blue light that would pass through the green filter 733 can be further prevented from being absorbed, which is more helpful for increasing light utilization rate.

In the meantime, a light-transparent sheet 782 is provided in a same layer as the reflective filter, and the light-transparent sheet 782 is provided below a blue filter 731.

In addition, an upper substrate 721 and an upper polarizer 711 are further sequentially provided on the color filter layer 730; an upper alignment layer 751, a liquid crystal layer 760, a lower alignment layer 752, a pixel electrode layer 770 made of a plurality of pixel electrodes, a lower substrate 722 and a lower polarizer 712 are further sequentially provided below a common electrode layer 740. Detailed description thereto is omitted here.

It is to be noted that, in addition to provide the reflective filter in the mentioned positions of the above four embodiments, the reflective filter can also be provided at other position below the color filter layer, for example, provided between the lower alignment layer and a TFT layer, and so on.

Furthermore, the display panel described by the present invention can also be other kind of display panel such as plasma display panel, in addition to liquid crystal display panel. When other kind of display panel is applied, setting principle of the display panel is similar to that of the above embodiments, and detailed description thereto is omitted here.

Fifth Embodiment

An embodiment of the present invention further provides a display device, and the display device comprises any one of the above-mentioned display panels. The display device can be any product or component that has display function, such as a liquid crystal panel, a mobile phone, a tablet computer, a television, a display, a laptop computer, a digital photo-frame, a navigating instrument or the like.

The display panel and the display device provided by the embodiments of the present invention, by providing a reflective filter below a color filter layer to reflect light with wavelength smaller than a predetermined value and by transmitting light with wavelength greater than or equal to the predetermined value, prevent this part of light that is reflected from being absorbed by the color filter, thus increases utilization rate of light emitted from a backlight, which is helpful for reducing power of the backlight or increasing brightness.

The above embodiments are only used to demonstrate the present invention and not limitative of the present invention; a common person skilled in the relevant art can make various modifications and variations without departing from the spirit and scope of the present invention; therefore, all equivalent technical solutions belong to the scope of the present invention; the scopes of the present invention are defined by the claims.

The invention claimed is:

1. A display panel, comprising a color filter layer, wherein a reflective filter is provided below the color filter layer; and the reflective filter is configured to reflect light with wavelength smaller than a predetermined value and configured to transmit light with wavelength greater than or equal to the predetermined value, and the reflective filter and a liquid crystal layer of the display panel are provided on a same side of the color filter layer, wherein a main film system of the reflective filter is represented as follows: $((H/2) L (H/2))^M$; where H stands for a first film layer; H/2 stands for a second film layer having a same refraction index as the first film layer, a thickness of the second film layer is half of a thickness of the first film layer; L stands for a third film layer; and M stands for a mount of period, wherein a formula of calculating the mount of period M is as follows: $T_R = (16 n_o n_g)/(n_H/n_L)^{2M} \{(n_o+n_g)^2+(((n_o n_g)/n_H)-n_H)^2\}$); where $T_R$ stands for transmittance of the reflective filter at a central wavelength of a stop band, $n_o$ stands for a refraction index of an upper base of the reflective filter, $n_g$ stands for a refraction index of a lower base of the reflective filter, $n_H$ stands for a refraction index of the first film layer, and $n_L$ stands for a refraction index of the third film layer.

2. The display panel as claimed in claim 1, wherein the reflective filter is provided above a common electrode layer.

3. The display panel as claimed in claim 1, wherein
the reflective filter is provided below a red filter and a green filter of the color filter layer; and
the predetermined value is greater than 470 nm and smaller than or equal to 500 nm.

4. The display panel as claimed in claim 3, wherein a light-transparent sheet is further provided below a blue filter of the color filter layer; and
the light-transparent sheet is provided in a same layer as the reflective filter and comprises a transparent material.

5. The display panel as claimed in claim 1, wherein
the reflective filter is provided below a red filter of the color filter layer; and
the predetermined value is greater than 530 nm and smaller than or equal to 620 nm.

6. The display panel as claimed in claim 5, wherein a light-transparent sheet is further provided below a blue filter and a green filter of the color filter layer; and
the light-transparent sheet is provided in a same layer as the reflective filter and comprises a transparent material.

7. The display panel as claimed in claim 1, wherein the reflective filter comprises a first reflective filter and a second reflective filter;
the first reflective filter is provided below a red filter of the color filter layer, configured to reflect light with wavelength smaller than a first predetermined value, and configured to transmit light with wavelength greater than or equal to the first predetermined value;
the first predetermined value is greater than 530 nm and smaller than or equal to 620 nm;
the second reflective filter is provided below a green filter of the color filter layer, configured to reflect light with wavelength smaller than a second predetermined value, and configured to transmit light with wavelength greater than or equal to the second predetermined value; and
the second predetermined value is greater than 470 nm, and smaller than or equal to 500 nm.

8. The display panel as claimed in claim 1, wherein a refraction index of the first film layer is higher than that of the third film layer.

9. The display panel as claimed in claim 1, wherein a formula of calculating . . . and λ stands for the predetermined value.

10. A display device, comprising the display panel as claimed in claim 1.

* * * * *